March 1, 1966
L. H. ENLOE
3,238,460
FREQUENCY MODULATION RECEIVER WITH
FREQUENCY RESTRICTED FEEDBACK
Filed April 25, 1961
4 Sheets-Sheet 1

INVENTOR
L. H. ENLOE
BY [signature]
ATTORNEY

March 1, 1966 L. H. ENLOE 3,238,460

FREQUENCY MODULATION RECEIVER WITH FREQUENCY RESTRICTED FEEDBACK

Filed April 25, 1961 4 Sheets-Sheet 2

INVENTOR.
L.H. ENLOE

BY [signature]

ATTORNEY

March 1, 1966 L. H. ENLOE 3,238,460

FREQUENCY MODULATION RECEIVER WITH FREQUENCY RESTRICTED FEEDBACK

Filed April 25, 1961 4 Sheets-Sheet 3

INVENTOR.
L.H. ENLOE

BY T. W. Adams, Jr.

ATTORNEY

INVENTOR.
L.H. ENLOE
BY [signature]
ATTORNEY

United States Patent Office 3,238,460

Patented Mar. 1, 1966

3,238,460

FREQUENCY MODULATION RECEIVER WITH FREQUENCY RESTRICTED FEEDBACK

Louis H. Enloe, Monmouth, N.J., assignor to Bell Telephone Laboratories, Incorporated, New York, N.Y., a corporation of New York Filed Apr. 25, 1961, Ser. No. 105,377

6 Claims. (Cl. 325—346)

This invention relates to receivers for frequency modulation signals and more particularly to improvements in such receivers to enhance their low-noise performance.

One of the principal problems faced in the design of long-range communication systems involves the recovery of modulated signals of relatively low level from a relatively high level of background noise which may result from sources either external to or within the receiver itself. This problem is of paramount importance, for example, in over-the-horizon communication systems, in communication systems employing space satellites as terminal or repeater stations, and in other broadband microwave systems in which the power available in the modulated signal applied to the receiver is limited by other considerations.

It is well known that increases in the signal-to-noise ratio of the demodulated signal can be obtained only by virtue of making a trade between such performance and the radio frequency bandwidth required for the transmission of the baseband or communication signal.

Transmission by frequency modulation represents one example of this trade. It is generally accepted that the greater the deviation of the carrier wave, the higher the signal-to-noise performance of the receiver may be. This process, however, cannot be carried out indefinitely and a threshold is reached at which any further increase in the deviation, and thus in the bandwidth required in the radio frequency spectrum, is ineffective to improve the signal-to-noise performance.

A special form of frequency modulation receiver was disclosed by J. G. Chaffee in Patent 2,075,503, March 30, 1937, and is variously referred to as frequency modulation with feedback or as a frequency compression demodulator. Briefly, in this type of receiver the frequency of the local oscillator is caused by a feedback circuit to follow variations in the demodulated signal wave. This has the effect of reducing the modulation index at the input of the intermediate frequency amplifier and, as will be discussed in greater detail hereinafter, may, under some circumstances, improve the signal-to-noise performance. Although it would appear that the feedback process could continue indefinitely with ever better results, this receiver, too, has a threshold beyond which signal-to-noise improvement has not been found to occur.

Since the threshold of signal-to-noise performance in frequency modulation with feedback receivers thus far obtained is sufficiently high so that it may be the limiting factor in the over-all performance of certain communication systems, it is the object of the present invention to reduce the threshold of frequency modulation with feedback receivers and thus improve the signal-to-noise performance thereof.

In accordance with this object, minimum threshold, low-noise performance is obtained by making the closed loop bandwidth of the feedback loop as narrow as possible. This is accomplished through the use of an open loop transfer function for the feedback demodulator which is determined by the use of an intermediate frequency amplifier having the characteristic of a single-tuned circuit and a noise bandwidth not quite as great as the closed loop bandwidth, and by the use of additional filtering elements, located in the feedback loop, restricting the open loop transfer to a bandwidth equal to that of the modulation signals to be received.

The above and other features of the invention will be described in the following detailed specification taken in connection with the drawing in which.

Figure 1:
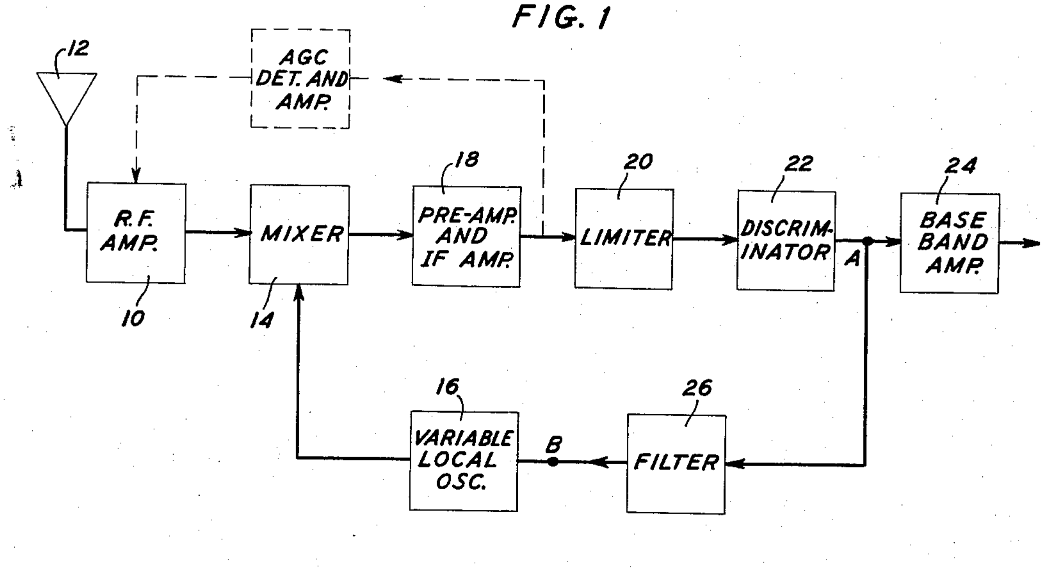
FIG. 1 is a block schematic diagram of a frequency modulation with feedback receiver in accordance with the invention.

The various methods of trading radio frequency bandwidth for noise performance referred to briefly above may now be considered in somewhat greater detail. The best known method of accomplishing this trade is found in the well-known frequency modulation receiver, the elements of which may be listed with reference to FIG. 1 as comprising a radio frequency amplifier 10 connected to a suitable antenna 12, a mixer 14, arranged to accept the amplified radio frequency signal and also the output of a local oscillator 16 and to produce an intermediate frequency carrier having the same modulation sidebands as the radio frequency signal. This carrier is amplified in an intermediate frequency amplifier 18 which may comprise both a preamplifier and a main amplifier together with appropriate filtering elements and is then applied to a limiter 20 arranged to eliminate variations in the amplitude of the intermediate frequency signals. A discriminator 22 operates upon the frequency modulation signal appearing at the output of the limiter to recover the modulation as a variable amplitude wave occurring in the modulation signal bandwidth. This wave is applied to an amplifier 24, herein identified as a baseband amplifier, and thence to any desired utilization circuit. The term "baseband" as used herein is intended to refer to the band of signals which are to be transmitted over the system and recovered by the receiver. The baseband may be the audio frequency band, the video frequency band, or any other band of signals which it is desired to transmit. In addition, and as indicated by dashed lines, an automatic gain control circuit may be added to reduce the amplitude range of the signal applied to the limiter.

It has been well established that in the operation of a frequency modulation system including a receiver as outlined above, signal-to-noise performance is improved by increasing the bandwidth of the intermediate frequency amplifier and at the same time by increasing the index at which the radio frequency carrier is modulated at the transmitter. This may be explained in terms of an analysis of the noise components which accompany the signal and appear at the input of the limiter. These components may be considered to comprise an in-phase or amplitude noise component and a quadrature or frequency noise component. Obviously, the latter component cannot be distinguished from the desired signal but the amplitude component may be removed through the operation of limiter 20 so long as the amplitude of the desired signal is sufficient at this point. On the other hand, the greater the deviation which may be employed at the transmitter, the greater the frequency swing appearing at discriminator 22 for the desired signal and, relatively, the smaller the frequency swing appearing at this point for the quadrature noise component. If the ratio of these two quantities is sufficient, the output of the discriminator in the desired signal baseband will not be appreciably affected by the noise.

Two factors limit the noise improvement available with such a frequency modulation receiver. The first of these is the practical problem of obtaining sufficient radio frequency bandwidth for the particular communication service to permit the use of wide deviation at the transmitter. The second of these, which sets a threshold of performance beyond which the signal-to-noise ratio cannot be improved, occurs when the amplitude of the noise at the input of the limiter exceeds the amplitude of the desired signal for any significant part of the time. Under these circumstances, so-called limiter "breaking" occurs and the limiter is no longer capable of suppressing the amplitude noise component in the signal appearing at the input of the discriminator. This threshold varies as a function of the pass band of the intermediate frequency amplifier since the broader the pass band the greater the band of in-phase noise which is accepted. Thus it is seen that further increase in the deviation of the signal is ineffective to improve the signal-to-noise performance in the recovered wave.

The frequency modulation with feedback receiver, sometimes referred to as an FMFB receiver, includes, between the points A and B of FIG. 1, a feedback loop by means of which the baseband signal is applied through some frequency restrictive element 26 to control the frequency of the local oscillator 16. In this arrangement, local oscillator 16 may be a so-called voltage-controlled oscillator in which the frequency of oscillation may be varied in proportion to variations in a voltage applied to a control terminal. As in the case of the frequency modulation receiver, the frequency of the local oscillator is nominally set at a value differing from the carrier frequency to be received by an amount equal to a desired intermediate frequency. This center frequency, however, is varied in response to the demodulated or baseband signal and has the same effect as reducing the index of modulation appearing at the input of the intermediate frequency amplifier.

In more detail, this receiver operates by canceling the quadrature noise components of the signal appearing at the output of mixer 14. The amplitude noise components are eliminated by the limiter, as in an ordinary frequency modulation receiver. Thus, the frequency or quadrature noise is demodulated or detected by the discriminator along with the desired signal and both are applied to modulate the frequency of the voltage-controlled oscillator 16. This produces both signal and noise sidebands which are applied to the mixer and there combined with the signal and frequency noise sidebands resulting from the incoming radio frequency wave. The net result is to reduce both the modulation index of the desired signal and that of the quadrature (frequency) noise components. Since the modulation index at the intermediate frequency is reduced, the pass band of intermediate frequency amplifier 18 may be reduced and, accordingly, the amount of amplitude or in-phase noise reaching the limiter may be considered to be reduced. As a result, the ultimate signal-to-noise improvement available before the threshold performance is reached may be improved because the noise components which cause limiter breaking are reduced.

Although it would appear that since amplitude noise is removed by the limiter and frequency noise by the feedback loop, the available signal-to-noise improvement attainable by increasing the modulation index at the transmitter should be without significant limit, such signal-to-noise improvement does not, in fact, occur for reasons which will be considered hereinafter. The present invention provides circuit arrangements by which the limiting threshold can be reduced by several orders of magnitude below that obtained in practice with the frequency modulation feedback receiver.

The low-noise receivers of the invention are based upon the discovery that a threshold, in addition to that imposed by breaking of the limiter as discussed above, is involved in frequency modulation feedback receivers. An appropriate understanding of this second threshold and a circuit arrangement such that both threshold occur at approximately the same point result in a receiver, the performance of which is significantly better than those heretofore produced.

It is found that the continued improvement of performance of a frequency modulation feedback receiver is not obtained without limit by the use of the frequency modulation feedback technique because the voltage-controlled oscillator does not produce frequency modulated components which will be appropriate to cancel the quadrature components of the incoming noise in a manner independent of the amount of feedback. As the amount of feedback increases, the index of modulation of the voltage-controlled oscillator 16 by the baseband signal is increased. For low modulation indexes, the modulated output of the voltage-controlled oscillator consists primarily of a single sideband on either side of the carrier frequency. The product of the carrier produced by the voltage-controlled oscillator and the incoming carrier yields a new carrier at the output of the mixer, while the product of the carrier from the voltage-controlled oscillator and the incoming quadrature and in-phase noise components yield new quadrature and in-phase noise at the output of the mixer. At the same time, the product of the quadrature sidebands appearing at the output of the voltage-controlled oscillator and the incoming carrier yields a second quadrature term in the mixer output which tends to cancel the original quadrature noise component, thus reducing the frequency or angle noise appearing at the output of the frequency detector. Additional higher order in-phase and quadrature noise components are produced but are of sufficiently small amplitude to be ignored.

If, however, the modulation index at which the voltage-controlled oscillator is modulated becomes large, additional sidebands other than the first pair of quadrature sidebands are produced with significant amplitude and upon mixing with the incoming carrier and noise components produce frequency noise which is not canceled and which, when fed back to the input of the voltage-controlled oscillator, causes a regenerative process which increases until severe distortion resulting from the amplitude noise impulses occurs in the demodulated signal. It is thus seen that a second threshold, not associated with limiter breaking, occurs in the feedback loop if the modulation index or, viewed from another standpoint, the phase variation of the voltage-controlled oscillator, becomes too great. According to the invention, the occurrence of this threshold is controlled by adjusting the root-mean-square phase of the voltage-controlled oscillator and restricting it to a small value. By appropriate choice of this value, the threshold imposed by this second effect may be made equal to that imposed by limiter breaking and an improvement of one or two orders of magnitude in the low-noise performance of the receiver may be obtained.

The desired result may be obtained by designing the circuit to minimize the closed loop bandwidth of the feedback loop or, stated in other words, to insure a high carrier-to-noise ratio in the closed loop bandwidth. A minimum closed loop bandwidth may be obtained by choosing the open loop transfer characteristic of the system in a particular way.

Figure 2:
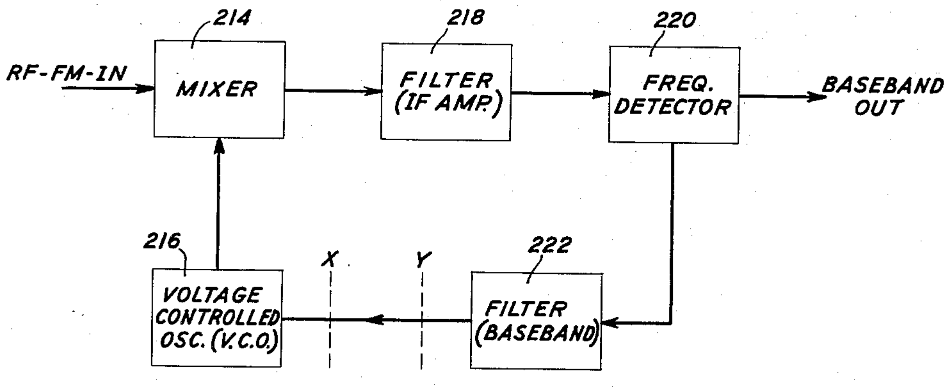
FIG. 2 is a block schematic diagram of the essential elements of the feedback demodulator of the receiver of FIG. 1.
Figure 3:
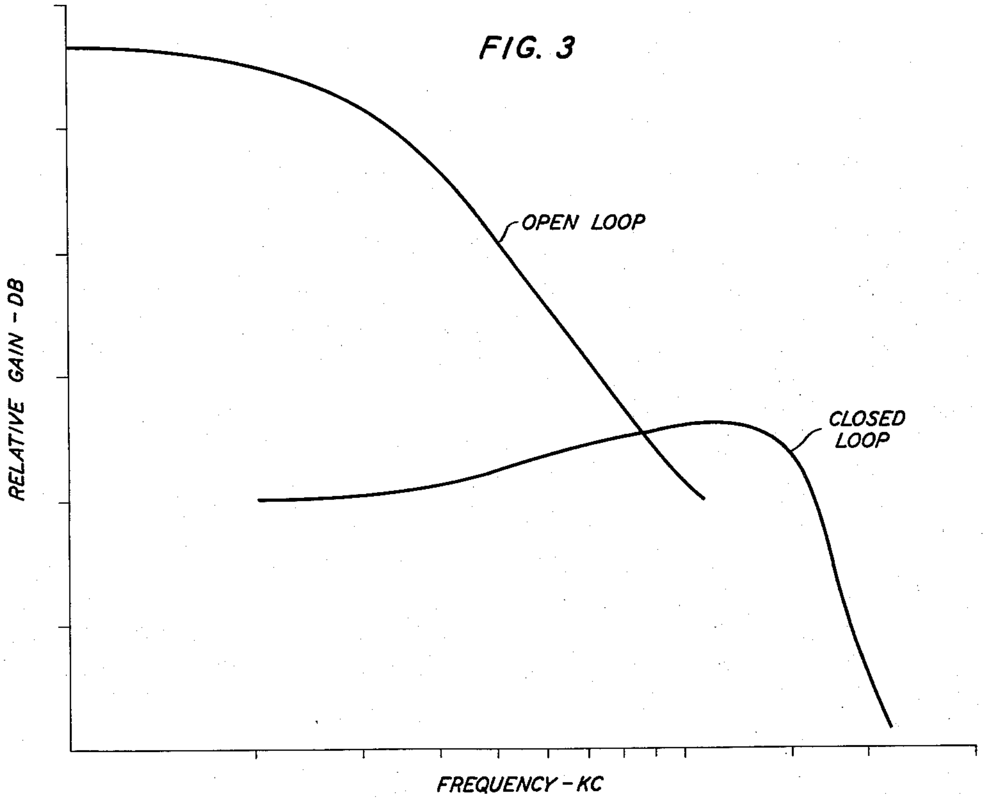
FIG. 3 is a graph illustrating typical open and closed loop transfer functions for receivers of the type disclosed in FIGS. 1 and 2.

The elements involved in this aspect of the design of a low-noise receiver in accordance with the invention are shown in FIG. 2 of the drawing. The frequency-modulated radio-frequency wave is applied to a mixer 214 and there combined with the output of a voltage-controlled oscillator 216 and the resultant output is applied to a unit identified merely as a filter 218. Ordinarily, filter 218 represents the frequency restrictive characteristics of the usual intermediate frequency amplifier. The output of filter 218 is applied to a frequency detector 220 which yields a baseband signal for application to a utilization circuit and also to control the phase of voltage-controlled oscillator 216. A baseband filter 222 acts upon the output of the frequency detector 220 prior to the application thereof to the control input of oscillator 216. The open loop transfer characteristic referred to above is taken as that measured by opening the feedback loop between the points X and Y and measuring the gain-frequency response under such conditions that the index at which voltage-controlled oscillator 216 is modulated is small compared to unity. A typical open loop transfer characteristic is illustrated in FIG. 3 of the drawing. The closed loop transfer characteristic, an example of which is also shown in FIG. 3 of the drawing, is obtained by measuring the gain-frequency performance with the loop closed between the points X and Y.

Figure 5:
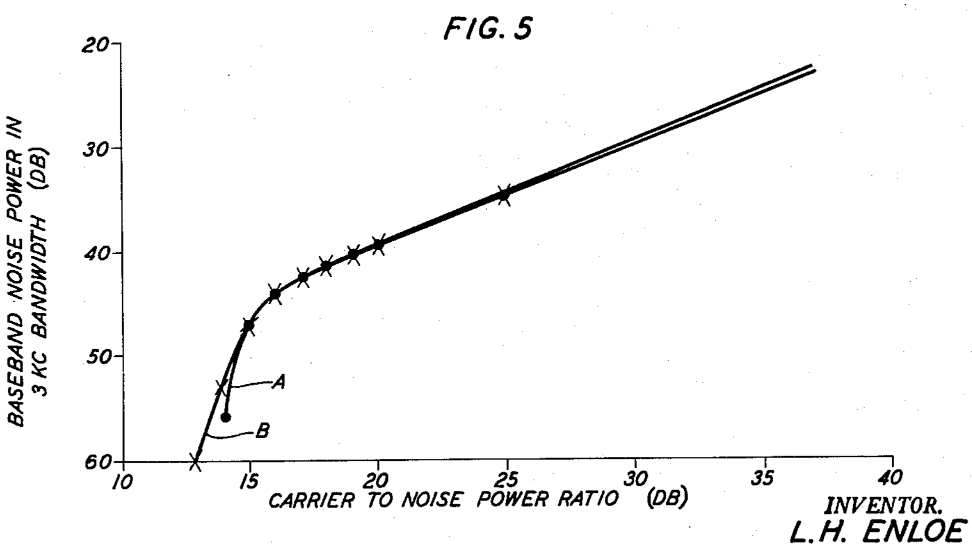
FIG. 5 is a graph relating the baseband noise power to the carrier-to-noise power ratio to indicate the threshold performance of typical receivers according to the invention.
Figure 4:
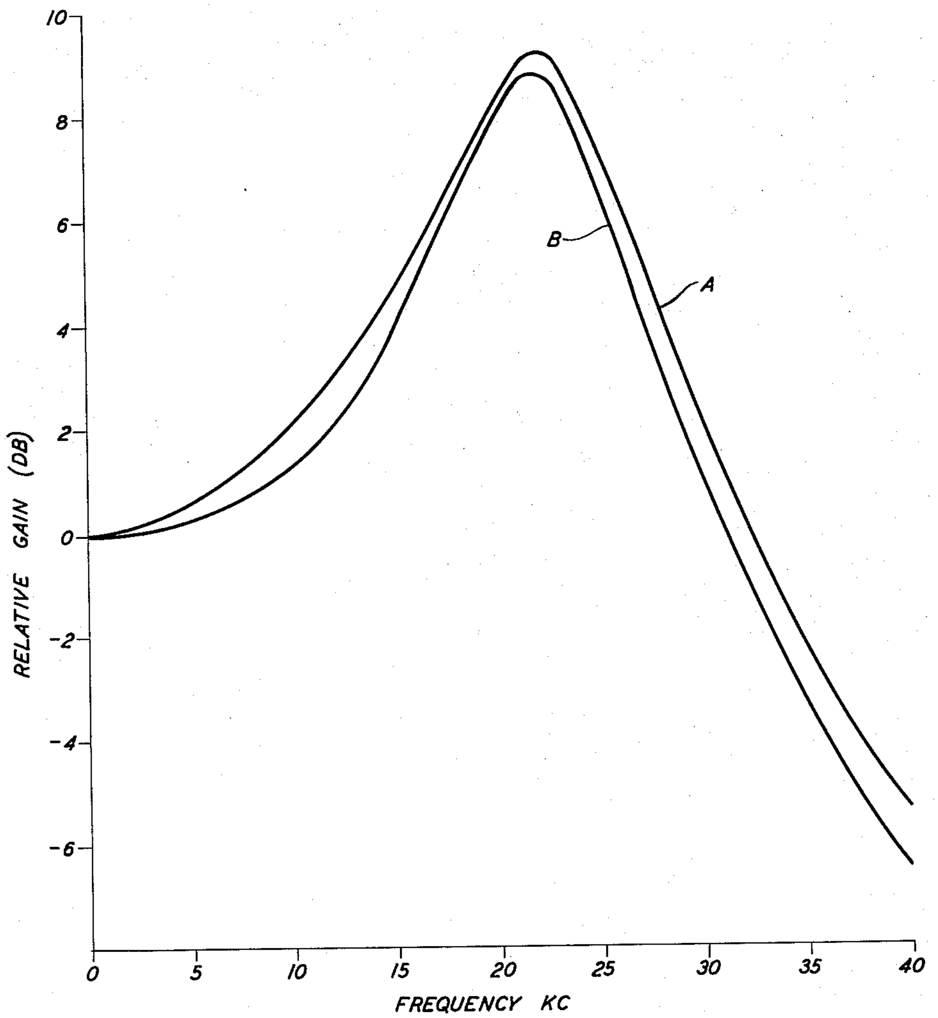
FIG. 4 is a graph illustrating measured closed loop transfer characteristics for typical receivers according to the invention.

It is found that the closed loop bandwidth may be minimized by choosing the open loop transfer function to have a bandwidth equal to that of the baseband signals and, in addition, to comply with the theory advanced by H. W. Bode in his book "Network Analysis and Feedback Amplifier Design," D. Van Nostrand, to obtain stability with an adequate phase margin. These requirements can be met by a number of physical circuit embodiments and the open loop transfer function is obtained by the combined action of filter 218 at the intermediate frequency and filter 222 at the baseband frequency. Thus, and as shown in FIG. 4 of the drawing, substantially the same open loop characteristics and thus closed loop responses can be obtained by different distributions of the filtering between filters 218 and 222. Curve A of FIG. 4 results, for example, when the intermediate frequency filter is a single pole filter of a 6-kilocycle bandwidth and filter 222 is a 15-kilocycle bandwidth single pole filter. Curve B, on the other hand, results when filter 218 is a 30-kilocycle single pole intermediate frequency filter and filter 222 is a 3-kilocycle single pole baseband filter. The corresponding graphs of baseband noise power as a function of carrier-to-noise power ratio for the two transfer characteristics of FIG. 4 are illustrated in FIG. 5 of the drawing and are substantially identical. It will be noted that for both curves A and B, which correspond to the conditions illustrated by curves A and B of FIG. 4, the threshold at which the impulse noise takes over occurs at substantially the same point.

While it is seen that a large number of distributions of filtering between filters 218 and 222 are possible before the second of the thresholds discussed above occurs, the maximum improvement in signal-to-noise performance is obtained when filter 218, the intermediate frequency filter, has the widest possible bandwidth, comprising a single-tuned filter having a noise bandwidth just enough less than the closed loop bandwidth to prevent limiter breaking from controlling the over-all threshold of the receiver. The remaining filtering required to obtain the requisite open loop transfer characteristic is introduced by the baseband filter 222 which does not appear directly in the signal path.

The ultimate effect of designing the receiver in this manner may be understood by considering the effect of such design upon the threshold of the limiter. As demonstrated above, reduction of the bandwidth of the intermediate frequency amplifier in a frequency modulation feedback receiver lowers the threshold at which limiter breaking occurs. It is found, however, that continued reduction of this bandwidth with corresponding increase in the amount of feedback does not produce a continued reduction in the threshold. This effect occurs despite the fact that decreasing the bandwidth of the amplifier should reduce amplitude noise at the limiter. At the same time, the maximum frequency deviation and thus the maximum reduction of frequency noise component is restricted.

The receiver of the invention permits a better balance among the various factors discussed above and permits an improved threshold. Without unnecessarily limiting signal-to-noise performance, the recognition of the second threshold and the choice of design such that the two thresholds are substantially the same permit the use of a wider intermediate frequency filter to obtain improved signal-to-noise ratio for the same threshold or the same signal-to-noise ratio with a lower threshold than the corresponding quantities obtained with previous frequency modulation feedback receivers.

Figure 6:
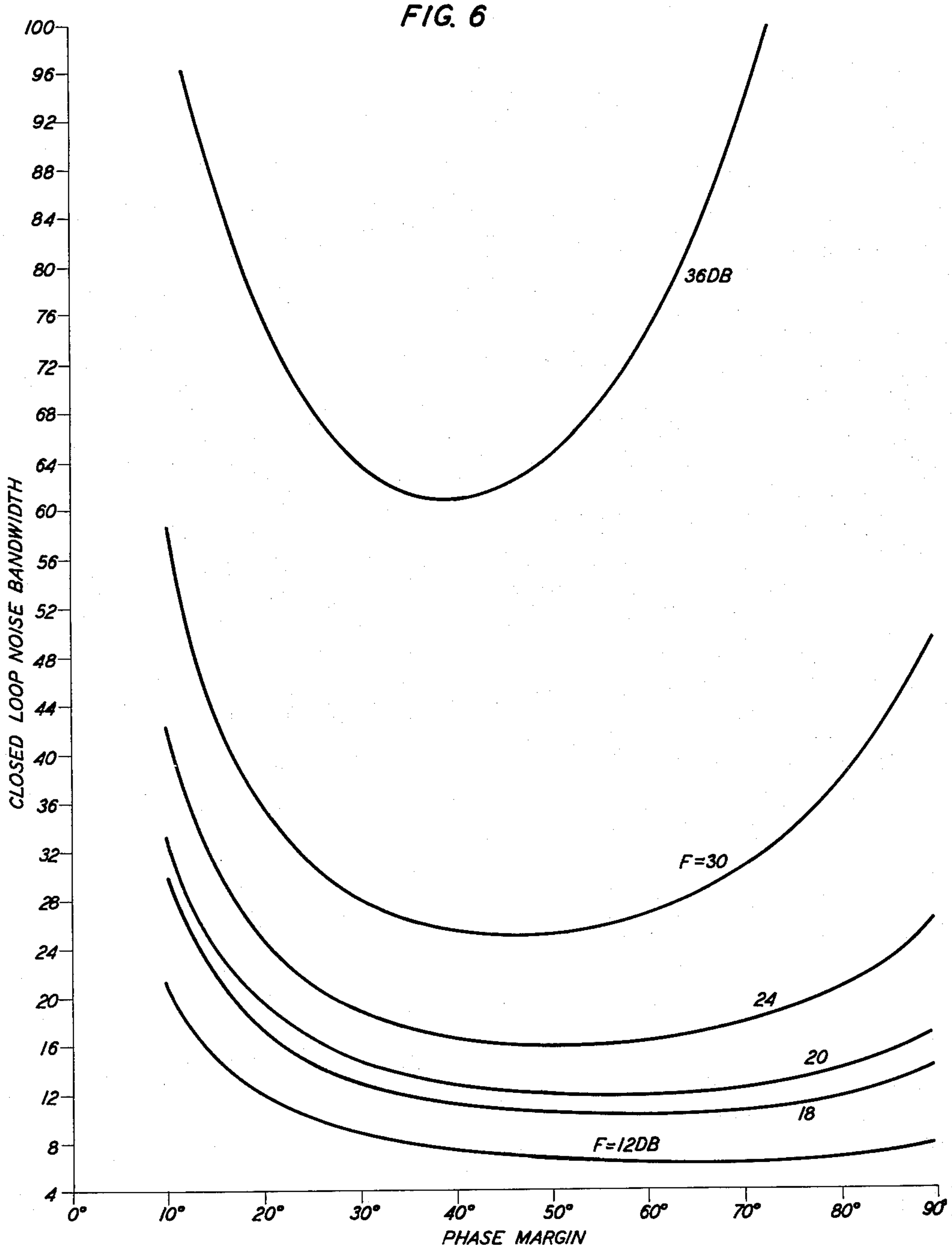
FIG. 6 is a graph relating the closed loop bandwidth, feedback factor and phase margin for systems having a particular open loop characteristic.

A practical receiver employing the invention may be designed with the aid of the curves presented at FIG. 6 of the drawing which relate closed loop bandwidth and phase margin for various feedback factors in a system having the open loop transfer function approximating the function required in accordance with the Bode theory referred to above. If such an open loop characteristic is employed with a typical phase margin of 50 degrees, we may assume, for purposes of explanation, a feedback factor of 20 db and a baseband bandwidth $f_b$ of 3 kilocycles. It will be seen from FIG. 6 that this choice minimizes the closed loop bandwidth. Further, the characteristic is to be obtained through the use of a single pole filter at the intermediate frequency with the remaining filtering introduced at the baseband frequency in the feedback loop. From FIG. 6, the closed loop bandwidth B equals 11.6 $f_b$ or 34.8 kilocycles. It has been found experimentally that the second threshold occurs when the root-means-square phase of the voltage-controlled oscillator is equal to $$\frac{1}{3.11}\pm 7\% \text{ radians}$$

At threshold, the carrier-to-noise ratio in this bandwidth is given by $$\rho=\frac{1}{2\Phi^2_{rms}}\left[\frac{K_vK_f}{1+K_vK_f}\right]^2=\frac{1}{2\left(\frac{1}{3.11}\right)^2}\left[\frac{9}{10}\right]^2$$

where $\Phi$ is the phase of the local or voltage-controlled oscillator and the product of $K_v$ and $K_f$ is the ratio of the phase or frequency of the wave at the input of the frequency detector to the corresponding quantity at the output of the voltage-controlled oscillator. This yields a result of 3.92 or 5.94 db. If a carrier-to-noise ratio of 8.5 db at the limiter is satisfactory, the first threshold occurs when the intermediate frequency bandwidth is 19.35 kilocycles (5.94 db in a 34.8-kilocycle bandwidth is equivalent to 8.5 db in a 19.35-kilocycle bandwidth). The noise bandwidth between 3 db points of a single pole intermediate frequency filter is given by $$\frac{19.35}{1.57}$$

or 12.3 kilocycles and the compressed wave could have an index of 2 in this filter and the peak-to-peak deviation in the radio frequency signal would be 120 kilocycles.

A typical frequency modulation receiver the same transmitted wave would have a threshold greater than 12 db in the 120-kilocycle band. The demodulator of the invention has a threshold improvement equal to $$12-5.94+10\log_{10}\frac{120}{34.8}=11.44\text{ db}$$

and the advantage is obvious.

What is claimed is:

1. In a demodulator for frequency modulation signals, a loop circuit including in the order named a mixer, a frequency detector and a source of oscillations of controllable frequency, means including a first filter connected in the path between said mixer and said detector and having the transmission characteristic of a single-tuned circuit and additional elements connected in the path between said detector and said source of oscillations for limiting the production of sidebands upon modulation of said source of oscillations by the signal from said detector to the first sideband pair, means for applying signals to be demodulated to said mixer, and means for abstracting demodulated signals from said frequency detector.

2. In a demodulator for frequency modulation signals, a loop circuit including in the order named a mixer, a first frequency restrictive element, a frequency detector, a second frequency restrictive element and a source of oscillations of controllable frequency, said first frequency restrictive element comprising a filter having the transmission characteristic of a single tuned circuit and a bandwidth less than the closed loop bandwidth of said loop circuit and the second frequency restrictive element limiting the open loop bandwidth to that of the modulation signals to be recovered, means for applying signals to be demodulated to said mixer, and means for abstracting demodulated signals from said frequency detector.

3. In a demodulator for frequency modulation signals, a closed loop circuit including in the order named a mixer, a frequency detector and a source of oscillations of controllable frequency, the closed loop bandwidth of said loop circuit being restricted to limit to the first sideband pair the production of any substantial sideband component at the output of said source of oscillations upon modulation of said source of oscillations by the demodulated signal from said frequency detector to the first sideband pair by frequency restrictive elements connected in said closed loop circuit of which the only one appearing in the path between said mixer and said frequency detector has a bandwidth substantially equal to but less than the closed loop bandwidth.

4. In a demodulator for frequency modulation signals, a loop circuit including in the order named a mixer, a frequency detector and a source of oscillations, means for aplying signals to be demodulated to said mixer, means for abstracting demodulated signals from said frequency detector, and means acting upon said source of oscillations for limiting changes in the phase of said source of oscillations resulting from modulation of said source by demodulated signals from said frequency detector to a phase of $$\frac{1}{3.11} \pm 7\% \text{ radians.}$$

5. In a receiver for frequency modulated waves, a variable frequency local oscillator, means for combining the output of said local oscillator and said frequency modulated waves to produce an intermediate frequency signal, an amplifier for said intermediate frequency signal, means for demodulating the amplified intermediate frequency signal, and feedback means including a frequency restrictive element for applying a portion of the demodulated signal to produce corresponding variations in the frequency of said local oscillator, the frequency characteristic of said intermediate frequency amplifier being that of a single-tuned circuit with a bandwidth substantially equal to but less than the closed loop characteristic of the feedback loop and said frequency restrictive element serving to limit the total open loop transfer characteristic to a bandwidth equal to that of the modulation signals to be recovered from said frequency modulated waves.

6. In a receiver for frequency modulated waves, a variable frequency local oscillator, means for combining the output of said local oscillator and said frequency modulated waves to produce an intermediate frequency signal, an amplifier for said intermediate frequency signal, means for eliminating amplitude variations from the output of said combining means and for demodulating the amplified intermediate frequency signal, and feedback means including a frequency restrictive element for applying a portion of the demodulated signal to produce corresponding variations in the frequency of said local oscillator, the frequency characteristic of said intermediate frequency amplifier being that of a single-tuned circuit with a bandwidth less than the closed loop bandwidth of the feedback loop and said frequency restrictive elements serving to adjust the open loop transfer characteristic to have a bandwidth equal to that of the modulation signals to be recovered from said frequency modulated waves.

References Cited by the Examiner

UNITED STATES PATENTS

| | | | |
|---|---|---|---|
| 2,272,401 | 2/1942 | Chaffee | 325—347 |
| 2,282,973 | 5/1942 | Koch | 325—346 |
| 2,383,359 | 8/1945 | Ziegler | 325—346 |
| 2,844,713 | 7/1958 | Zuckerman | 325—346 |
| 2,869,080 | 1/1959 | Bycer | 325—422 |
| 2,989,622 | 6/1961 | Doherty | 325—45 |

DAVID G. REDINBAUGH, *Primary Examiner.*

SAMUEL B. PRITCHARD, *Examiner.*